United States Patent [19]
Tominaga

[11] Patent Number: 5,485,070
[45] Date of Patent: Jan. 16, 1996

[54] STEPPING-MOTOR DRIVING SYSTEM

[75] Inventor: Hidekazu Tominaga, Kawasaki, Japan

[73] Assignee: Canon Kabushiki Kaisha, Tokyo, Japan

[21] Appl. No.: 120,343

[22] Filed: Sep. 14, 1993

[30] Foreign Application Priority Data

Sep. 29, 1992 [JP] Japan .................................... 4-283669

[51] Int. Cl.$^6$ .................................................. H02P 8/00
[52] U.S. Cl. ........................... 318/696; 318/685; 318/599; 318/603
[58] Field of Search ..................... 318/685, 696, 318/254, 138, 439, 599–603

[56] References Cited

U.S. PATENT DOCUMENTS

| | | | |
|---|---|---|---|
| 3,909,693 | 9/1975 | Yoshitake et al. | 318/696 |
| 4,636,959 | 1/1987 | Salazar et al. | 318/696 X |
| 4,707,649 | 11/1987 | Kanemura | 318/685 |
| 4,959,738 | 9/1990 | Fujii et al. | 318/685 X |
| 5,032,780 | 7/1991 | Hopkins | 318/696 |
| 5,216,345 | 6/1993 | Eyerly | 318/685 |

*Primary Examiner*—David S. Martin
*Attorney, Agent, or Firm*—Fitzpatrick, Cella, Harper & Scinto

[57] ABSTRACT

A stepping-motor driving system includes a driver for driving a stepping motor by switching an exciting phase thereof. The driver includes a delay-compensation-type pulse-width modulation circuit for compensating for the delay caused by the time constant of an exciting coil of the stepping motor. The delay-compensation-type pulse-width modulation circuit compensates for the delay in the rise and/or fall of the current of the exciting coil. The system also includes a memory for storing time data of the differential value of an immediately preceding exciting-phase switching time in a table of an exciting-phase switching time of the stepping motor. The system also includes a controller for controlling the driver. The controller includes a timer. The controller increments the timer until the count of the timer equals the value of one of the time data stored in the memory. The controller causes the driver to switch an exciting phase of the stepping motor in response to the incrementing of the timer to equal the value of the one of the time data.

6 Claims, 11 Drawing Sheets

FIG.7(a)
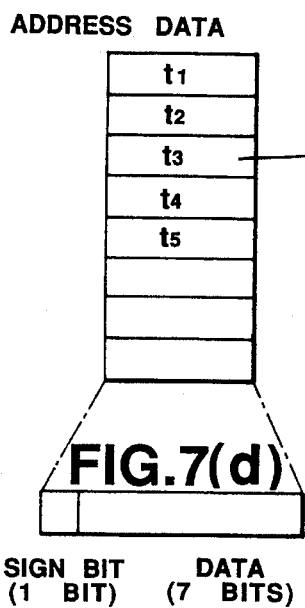
ADDRESS DATA
FIG.7(b)
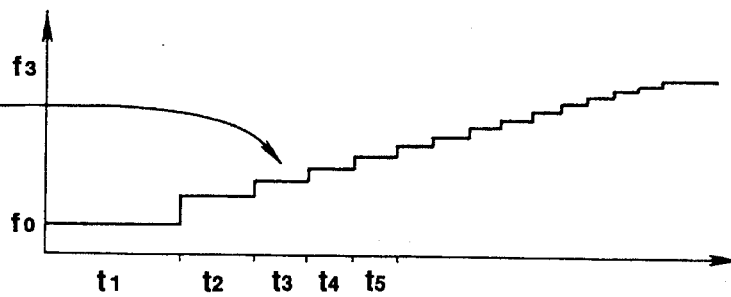
FIG.7(d)
SIGN BIT (1 BIT) | DATA (7 BITS)
FIG.7(c)
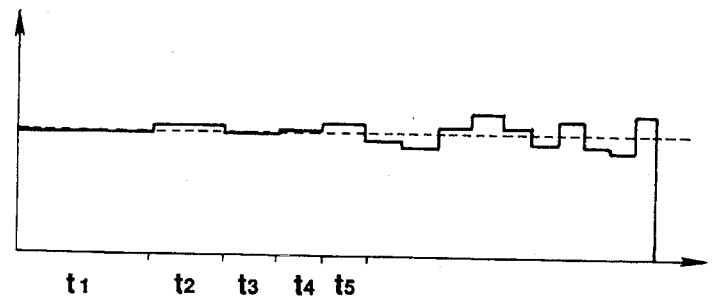

FIG.8(a) FIG.8(b) FIG.8(c)

| FIG.8(a) | FIG.8(b) | FIG.8(c) | |
|---|---|---|---|
| 400 | 500 | 500 | ← INITIAL VALUE |
| 530 | 377 | -123 | — DIFFERENTIAL VALUE |
| 660 | 303 | -74 | |
| 790 | 253 | -50 | |
| 912 | 219 | -34 | |
| 1017 | 197 | -23 | |
| 1111 | 180 | -17 | |
| 1198 | 167 | -13 | |
| 1278 | 157 | -10 | |
| 1353 | 148 | -9 | |
| 1424 | 140 | -7 | |
| 1491 | 134 | -6 | |
| 1556 | 129 | -6 | |
| 1617 | 124 | -5 | |
| 1677 | 119 | -4 | |
| 1734 | 115 | -4 | |
| 1789 | 112 | -4 | |
| 1843 | 109 | -3 | |
| 1895 | 106 | -3 | |
| 1946 | 103 | -3 | |
| 1995 | 100 | -3 | |
| 2000 | 100 | 0 | |
| SPEED TABLE(pps) | SWITCHING-TIME TABLE(× 5μsec) | SWITCHING-TIME TABLE(× 5μsec) | |

FIG.9(a)
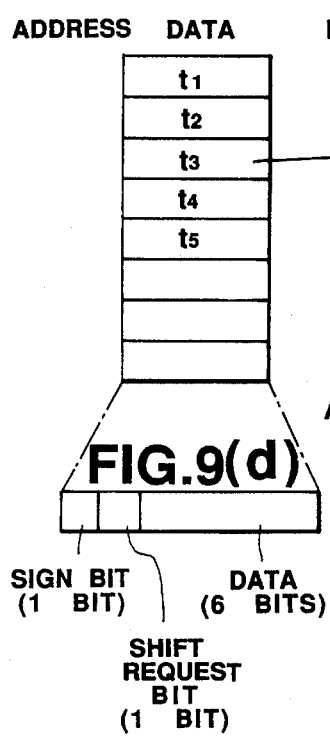
ADDRESS    DATA
SIGN BIT (1 BIT)
SHIFT REQUEST BIT (1 BIT)
DATA (6 BITS)
FIG.9(d)
FIG.9(b)
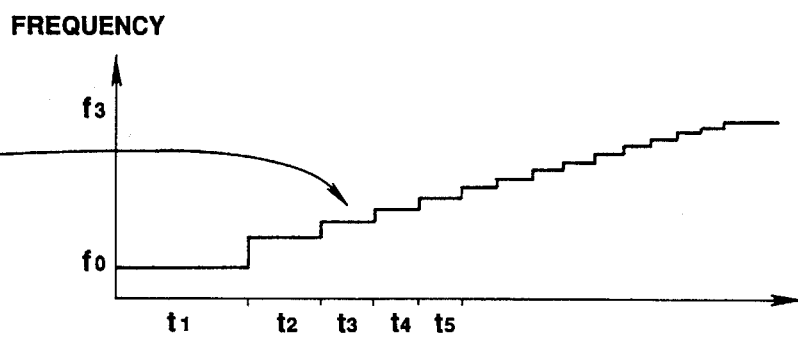
FREQUENCY
FIG.9(c)
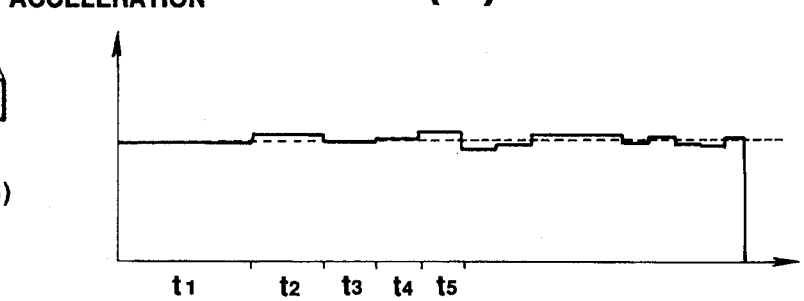
ACCELERATION
FIG.9(e)
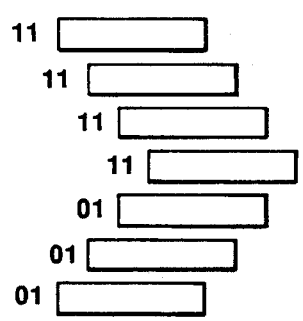

STEPPING-MOTOR DRIVING SYSTEM

FIELD OF THE INVENTION

This invention relates to a stepping-motor driving system producing only small variations in acceleration.

DESCRIPTION OF THE RELATED ART

In general, a driving control circuit for a stepping motor is configured as shown in FIG. 1. In FIG. 1, CPU (central processing unit) 1 controls the entire control apparatus. ROM (read-only memory) 2 stores control programs, a table of the motor-exciting-phase switching time, and the like. Oscillator 3 generates a clock signal which serves as a reference for CPU 1. Motor driver 4 drives motor 5 according to an exciting pattern received from CPU 1. A description will now be provided of the operation of the stepping-motor driving control circuit having the configuration of FIG. 1 with reference to FIGS. 2(a) through 2(c).

In general, a stepping motor starts to operate at a self-starting frequency, and can operate even at a considerably higher frequency by gradually increasing its operating frequency. As shown in FIG. 2(a), one piece of time data corresponding to the exciting-phase switching time set in the table stored in ROM 2 (see FIG. 1) is retrieved and a timer included within CPU 1 is incremented until the count on the timer equals the value of the time data. After this is accomplished, the exciting phase is switched, and the subsequent time data is retrieved from the table. For example, suppose that the timer is incremented until the count equals the value of the time data $t_3$ based on the table shown in FIG. 2(a). After this is accomplished, the exciting phase is switched, and time data $t_4$ of the next address is received in CPU 1. Similarly, after the timer is incremented until the count equals the value of the time $t_4$ within CPU 1, the exciting phase is switched, and time data $t_5$ of the subsequent address is received in CPU 1. Time data ace set so as to become gradually shorter, so that the stepping motor is accelerated. FIG. 2(b) illustrates the manner of such acceleration. The exciting-phase switching time when performing linear acceleration as shown in FIG. 2(b) is determined according to the following expression.

That is, if the initial frequency is represented by $f_0$, if the final frequency is represented by $f_n$, if the acceleration is represented by $\beta$, and if the motor is accelerated in steps, the motor-exciting-phase switching time $t_m$ (m=0, 1, 2, 3, . . . , n) is expressed by:

$$t_m = (SQRT(2 \times \beta \times m + f_0 \times f_0) - f_0)/\beta,$$

where $\beta = (f_n - f_0)/t_n$.

Each of the data of the table shown in FIG. 2(a) comprises 8 bits. Hence, time $t_m$ can have 255 kinds of values between 1 and 255. If the time of 10 μsec is set for each data, time $t_m$ has discrete values between 10 μsec and 2.55 msec.

However, in the above-described stepping-motor control circuit, when the mass and the moment of inertia of the load have large values in a linear motion system and in a rotational motion system, acceleration cannot be increased unless the external force and the torque applied to the load are increased, respectively. When the external force or the torque is limited, the speed must be gradually increased with a small acceleration. When the range of target speeds has a large value, the quantization error has a large value since each data comprises 8 bits. For example, in the case of accelerating from 200 pps (pulses per second) to about 2000 pps, the time, which is the reciprocal of these values, must be counted from 500 μsec to 5 msec. In the case of 8-bit data in which time can be counted only in the range of 1–255, the minimum unit is 20 μsec, and the value of data equals 25 for the final speed 2000 pps. The values of data for speeds lower than the speed corresponding to the value of data 25 (20 μsec×25=500 μsec) equal 26 and 27, since the value is proportional to the reciprocal of the speed. Hence, the speeds corresponding to these values equal 1923 pps and 1852 pps.

As described above, quantization error increases at a high-speed region near the final speed. Hence, when linear acceleration as shown in FIG. 2(b) is performed, variations in speed, and acceleration after recalculation become as shown in FIG. 2(c). FIG. 2(c) indicates the following result. That is, motor-exciting-phase switching is determined by calculating acceleration β. Acceleration β must have a constant value, as indicated by a broken line in FIG. 2(c), if no quantization error is present. However, by performing digitization and taking into consideration quantization error, the calculated values of acceleration will become about 1.5–2 times the acceleration β near the final speed. This will reduce the torque margin, and cause loss of synchronism in the worst case. If the torque margin is increased in order to prevent loss of synchronism in the worst case, acceleration must be reduced, thereby causing an increase in the time required for movement. While this problem is overcome if the data length is changed from 8 bits to 16 bits, a larger capacity is then needed for the ROM, thereby causing an increase in the production cost. Particularly in the case of a system configured by a one-chip microprocessor, the capacity of the ROM is limited, and therefore a large portion of the capacity of the ROM cannot be used for the table. Accordingly, it is difficult to increase the data length to 16 bits.

Next, the conventional driver circuit 4 of the stepping-motor driving control circuit shown in FIG. 1 will be studied. Conventionally, a constant-current PWM (pulse-width modulation) driving circuit as shown in FIG. 3 is generally used as a high-efficient low-loss stepping-motor driving circuit. FIG. 4 illustrates an outline of the operation of this constant-current PWM driving circuit. In FIG. 3, when exciting a certain phase of the stepping motor, transistor Tr1 connected to the corresponding coil of the stepping motor is turned on and control circuit 10 is also operated by a signal from CPU 1. In this state, control circuit 10 turns on transistor TrA, and detects whether coil current $i_A$ has reached a predetermined current value by current detecting resistor 12. When coil current $i_A$ has reached the predetermined current value, a switch configured by transistor TrA is turned off for a predetermined time period. That is, as shown in FIG. 4(c), when transistor TrA has been turned on, coil current $i_A$ exponentially increases. When current detecting resistor 12 has detected that the coil current has reached the predetermined current value, transistor TrA is turned off for the predetermined time period, and coil current $i_A$ exponentially decreases during this predetermined time period. After the lapse of a predetermined time period, control circuit 10 again turns on transistor TrA. After the coil current has reached the predetermined current value, transistor TrA is again turned off for the predetermined time period. The above-described cycle is repeated. As a result, as shown in FIG. 4(c), coil current $i_A$ becomes substantially constant except at the initial rise period. Thus, a constant-current operation is performed. However, since such a control method performs closed-loop control by detecting current, this method has disadvantages in that, for example, a complicated circuit is required, and electric power is lost in the current-detecting resistor.

FIG. 5 illustrates another example of the circuit in which current-detecting resistor 12 is omitted and open-loop control is performed instead of closed-loop control in the above-described method. In this circuit, transistor Tr1 is turned on and pulse-width modulation circuit 14 is also operated by a signal from CPU 1. As shown in FIG. 6, in the operation of this circuit, the current gradually increases and is saturated at a predetermined current value. If power-supply voltage is represented by V, if the resistance of the coil is represented by $R\Omega$, if the rise time constant is represented by $\tau_1$, if the fall time constant is represented by $\tau_2$, if the "on" time of the pulse is represented by $T_1$, and if the "off" time of the pulse is represented by $T_2$, the current value repeats "on" and "off" around the following average value:

$$i_A = V/R \times T_2/\{T_1 + (\tau_1/\tau_2) \times T_2\} \times \{1 - \exp(-t/\tau_1)\} \tag{1}$$

While the driving circuit shown in FIG. 5 can remove electrical power consumption caused by current-detecting resistor 12 in contrast to the driving circuit shown in FIG. 3, the rise time constant $\tau_1$ is not improved. Hence, this driving circuit has poor responsiveness for high-speed driving, and therefore is not suitable for a high-pulse-rate operation.

SUMMARY OF THE INVENTION

It is an object of the present invention to overcome the above-described problems.

It is another object of the present invention to provide a driving control system for a stepping motor having only small variations in acceleration with a conventional hardware configuration.

It is still another object of the present invention to provide a high-efficiency driving control system for a stepping motor which does not require complicated circuitry, and in which, while maintaining the same degree of responsiveness as a constant-current PWM driving circuit, electrical power consumption caused by a current-detecting resistor is absent in contrast to a constant-current PWM driving circuit.

According to one aspect, the present invention which achieves these objectives relates to a stepping motor driving system comprising driving means for driving a stepping motor by switching an exciting phase thereof, storage means for storing time data of the differential value of an immediately preceding exciting-phase switching time in a table of an exciting-phase switching time of the stepping motor, and control means for controlling the driving means. The control means comprises a timer. The control means increments the timer until the count of the timer equals the value of one of the time data stored in the storage means. The control means causes the driving means to switch an exciting phase of the stepping motor in response to the incrementing of the timer to equal the value of the one of the time data.

In one embodiment, each time data of the table stored in the storage means includes a sign bit. In the same or in another embodiment each time data of the table stored in the storage means includes a shift-request bit.

According to still another aspect, the present invention which achieves these objectives relates to a stepping motor driving system comprising driving means for driving a stepping motor by switching an exciting phase thereof. The driving means comprises a delay-compensation-type pulse-width modulation circuit for compensating for the delay caused by the time constant of an exciting coil of the stepping motor. The delay-compensation-type pulse-width modulation circuit compensates for the delay in the rise and/or fall of the current of the exciting coil. The system further comprises storage means for storing time data of the differential value of an immediately preceding exciting-phase switching time in a table of the exciting-phase switching time of the stepping motor. The system further comprises control means for controlling the driving means. The control means comprises a timer. The control means increments the timer until the count of the timer equals the value of one of the time data stored in the storage means. The control means causes the driving means to switch an exciting phase of the stepping motor in response to the incrementing of the timer to equal the value of the one of the time data.

The driving means can comprise a driving transistor for causing the flow of the current in the exciting coil. The delay-compensation-type pulse-width modulation circuit comprises a pulse-width compensation circuit for causing the flow of a desired average current in the coil. The driving means further comprises a counter for counting the time the driving transistor remains turned on during the rise of the current of the coil. The driving means further comprises an OR circuit receiving the output of the pulse-width modulation circuit and the output of the counter.

These and other objects, advantages and features of the present invention will become more apparent from the following description of the preferred embodiments taken in conjunction with the accompanying drawings.

BRIEF DESCRIPTION OF THE DRAWINGS

FIGS. 7(a) through 7(d) are schematic diagrams illustrating the control operation of a stepping-motor driving control circuit according to an embodiment of the present invention;

FIGS. 8(a) through 8(c) are diagrams illustrating specific examples of differential values of the data table shown in FIG. 7(a);

FIGS. 9(a) through 9(e) are schematic diagrams illustrating the control operation of a stepping-motor driving control circuit according to another embodiment of the present invention;

DESCRIPTION OF THE PREFERRED EMBODIMENTS

A description will now be provided of a preferred embodiment of the present invention with reference to the drawings.

Figure 1:
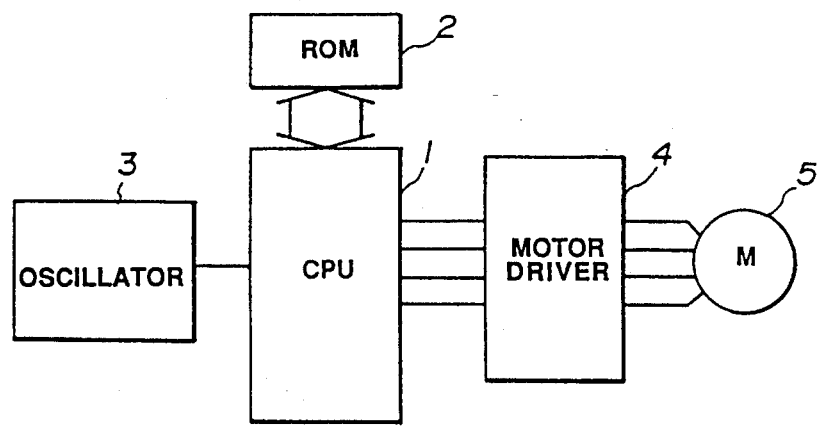
FIG. 1 is a block diagram illustrating the configuration of a driving control circuit for a stepping motor.

A stepping-motor driving control circuit of the present invention has the same hardware configuration as the conventional circuit shown in FIG. 1.

In FIG. 1, CPU 1 controls the entire control apparatus. ROM 2 stores control programs, a table of the motor-exciting-phase switching time, and the like. Oscillator 3 generates a clock signal which serves as reference for CPU 1. Motor driver 4 drives motor 5 according to an exciting pattern received from CPU 1.

FIGS. 7(a) through 7(d) are diagrams illustrating the operation of the stepping-motor driving control circuit of the present invention. FIG. 7(a) illustrates a table of the exciting-phase switching time of the present invention. The time data $t_1$ represents the absolute exciting phase switching time, which is shown, for example, as the top value, 500, in FIG. 8(c). The data for the other times $t_2$–$t_n$, do not represent the absolute exciting phase switching times. Rather, time data $t_2$–$t_n$ stored in the table represent the amount of time by which the immediately preceding time is changed, i.e., a differential value. Thus, the second value from the top of the table shown in FIG. 8(c) is −123, which is a differential value. To compute the exciting phase switching time corresponding to this value, an arithmetic and logic circuit within the CPU 1 retrieves the time data $t_1$, 500, and time data $t_2$, −123, and subtracts $t_2$ from $t_1$, to arrive at an absolute exciting phase switching time of 377. As shown in FIG. 7(a), the table of the exciting-phase switching time is provided, and one time data set in the table is retrieved and a timer included within CPU 1 is incremented until the count on the timer equals the value calculated by the arithmetic and logic circuit based on the retrieved time data. After this is accomplished, the exciting phase is switched, and the subsequent time data is retrieved from the table. For example, suppose that the timer is incremented until the count on the timer equals the value calculated by the arithmetic and logic circuit based on the time data $t_3$ in the table shown in FIG. 7(a). After this is accomplished, the exciting phase is switched, and time data $t_4$ of the next address is received in CPU 1. Similarly, after the timer is incremented until the count on the timer equals the value calculated by the arithmetic and logic circuit based on the time data $t_4$ within CPU 1, the exciting phase is switched, and time data $t_5$ of the subsequent address is received in CPU 1. Time data are set so as to become gradually shorter, so that the stepping motor is accelerated. FIG. 7(b) illustrates the manner of such acceleration. The exciting-phase switching time when performing linear acceleration as shown in FIG. 7(b) is determined according to the following expression.

That is, if the initial frequency is represented by $f_0$, if the final frequency is represented by $f_n$, if the acceleration is represented by $\beta$, and if the motor is accelerated in n steps, the motor-exciting-phase switching time $t_m$ (m=0, 1, 2, 3, . . . , n) is expressed by:

$$t_m = (SQRT(2 \times \beta \times m + f_0 \times f_0) - f_0)/\beta,$$

where $$\beta = (f_n - f_0)/t_n.$$

Each of the data of the table shown in FIG. 7(a) comprises 8 bits. Hence, time $t_m$ can have 285 values between 1 and 255. However, by providing differential values, it is possible to provide a resolution having a value greater than 8 bits, for example, a resolution of 10 bits. In order to provide a resolution of 10 bits, it is necessary to have data having 1023 values between 1 and 1023. However, data of the exciting-phase switching time table do not abruptly change since each data is related to the preceding data. That is, each data has a value which can be sufficiently represented by [1 bits.

Figure 2A:
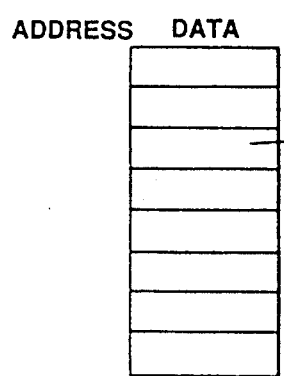
FIGS. 2(a) through 2(c) are diagrams illustrating a conventional control operation of the stepping-motor driving control circuit shown in FIG. 1.
Figure 2B:
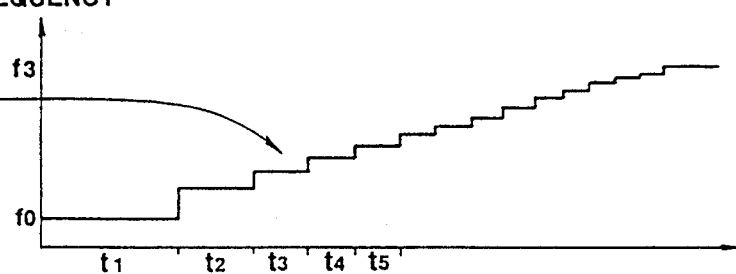
Figure 2C:
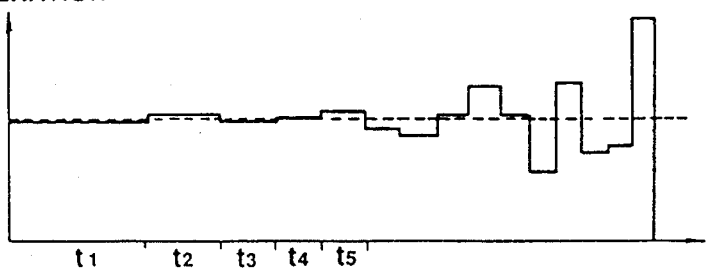

FIG. 7(d) illustrates the configuration of each data. In this configuration, each incremental or decremental data is expressed by two components. The most significant bit is a sign bit, and the other seven bits represent the differential value. The sign bit is represented by 0 and 1 for + and −, respectively. When the differential value equals 0, the preceding value is repeated. This is represented by using all 0's for the 8 bits. When the sign bit equals 1, the value of the differential exciting phase switching time is obtained by adding 1 to a value obtained by inverting each bit of the differential value expressed in binary notation. FIG. 7(b) illustrates variations in speed when linear acceleration is performed using such an exciting-phase switching time table having a resolution of 10 bits. FIG. 7(c) illustrates the calculated values of acceleration at that time. It becomes clear from FIG. 7(c) that variations in acceleration are reduced compared with the conventional case shown in FIG. 2(c). Although in the above-described embodiment, each data of the table comprises 10 bits, the present invention is not limited to this value, but may be applied to cases of 11 bits, 12 bits and the like. Although in the above-described embodiment, the most significant bit of 8-bit data is allocated to the sign bit, the sign bit becomes unnecessary if regions for an incremental table and a decremental table are determined, and different methods of calculation are provided for incremental and decremental cases. Although in the above-described embodiment, a description has been provided of linear acceleration, the present invention may also be applied to the case of exponential acceleration.

The reason why a resolution of at least 8 bits is obtained by providing the differential value will be explained with reference to FIGS. 8(a) through 8(c).

When the motor is accelerated from 400 pps to 2000 pps as shown in FIG. 8(a), values of the time, which correspond to the reciprocal of the values shown in FIG. 8(a), are as shown in FIG. 8(b). These data values are obtained by rounding off the last digit of each obtained data in units of 5 μsec. It can be understood from data values shown in FIG. 8(b) that the three data having the highest values exceed 256, and therefore cannot be represented by 8 bits.

Values shown in FIG. 8(c) represent differential values of data values shown in FIG. 8(b). It can be understood from FIG. 8(c) that respective values shown therein (not including the first data value) do not exceed 128, and therefore can be represented by 7 bits, and therefore by 8 bits including the above-described sign bit. Since the differential value cannot be obtained for the first data value in FIG. 8(c), the initial value of 500×5 μsec is set in advance in CPU 2.

FIG. 9(d) illustrates the configuration of data according to another embodiment of the present invention. In this embodiment, a shift request bit is further added to the data of the first embodiment. The shift request bit is added to exciting-phase switching time data, obtained by providing the differential value of the immediately preceding value, in order to improve resolution in a region in which the speed of the stepping motor is high. Moreover, as indicated in the above-described calculation expression, the exciting-phase switching time is obtained by providing the reciprocal of the speed. Hence, if the time is counted by the same clock signal, high resolution is required for a high-speed region. In the present embodiment, in consideration of such requirements, a coarse resolution is provided for a region in which the speed of the stepping motor is low, and a fine resolution is provided for a region in which the speed of the stepping motor is high. Thus, it is possible to provide a motor acceleration/deceleration control circuit having further, smaller variations in acceleration.

In FIG. 9(d), when the exciting-phase switching time is reduced and it is desired to provide a higher resolution than that of the preceding value when obtaining the differential value of the preceding value, by providing a shift request bit, the differential data is shifted to the right by one bit, and the resultant data is subtracted from the preceding data, whereby the resolution is increased. On the other hand, when the exciting-phase switching time is increased and it is desired to provide a numeral which has a longer bit length than that of the preceding numeral, by providing a shift request bit, the differential-value data is shifted to the left by one bit, and the resultant data is added to the preceding data, whereby a numeral which has a longer bit length is provided. That is, as shown in FIG. 9(e), when the two most significant bits of the differential-value data equal 11, the differential-value data is shifted to the right by one bit. When the two most significant bits of the differential-value data equals 01, the differential-value data is shifted to the left by one bit. The clock signal for counting may have a resolution so as to be able to count the minimum value when the data is shifted to the rightmost position. FIG. 9(b) illustrates variations in speed when linear acceleration is performed using the data in the exciting-phase switching time table having the resolution of the present embodiment. FIG. 9(c) is a diagram obtained by recalculating acceleration at that time. In the present invention, theoretically, it is possible to infinitely increase resolution. However, in consideration of the reference clock signal for counting, the clock signal for counting is set to 2.5 μsec, and the resolution is set to 12 bits. Although in the above-described embodiment, the second significant bit of 8-bit data is allocated to the sign bit, the sign bit becomes unnecessary if regions for an incremental table and a decremental table are determined, and different methods of calculation are provided for incremental and decremental cases.

Figure 10:
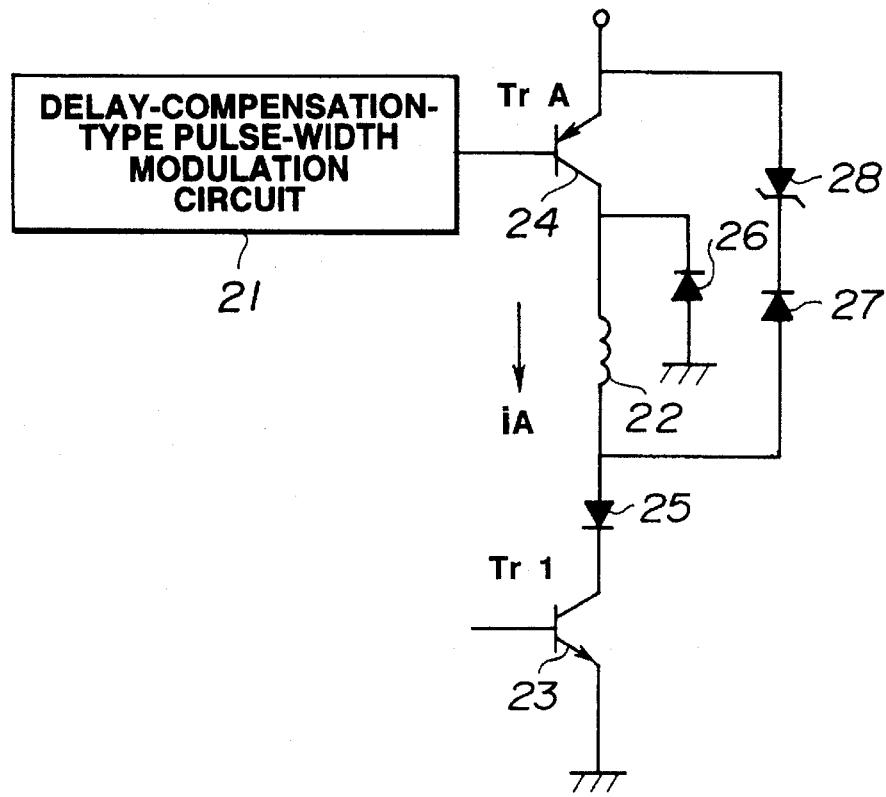
FIG. 10 is a circuit diagram of the motor driver circuit shown in FIG. 1 which can be applied to the present invention.

Next, a description will be provided of a preferred example of motor driver circuit 4 of the stepping-motor driving control circuit shown in FIG. 1 with reference to FIG. 10. In FIG. 10, reference numeral 21 represents a delay-compensation-type pulse-width modulation circuit, the details of which will be described with reference to FIGS. 11 and 12. Reference numeral 22 represents the coil of the stepping motor. Transistor Tr1 23 constitutes a main switch for determining the exciting phase. Transistor TrA 24 is turned on and off by a control signal from delay-compensation-type pulse-width modulation circuit 21. Transistor Tr1 23 is turned on and delay-compensation-type pulse-width modulation circuit 21 is also operated by a signal from CPU 1. Reference numeral 25 represents a backflow-preventing diode. Flywheel diode 26 has the function of causing the continuous flow of energy stored in coil 22 as regenerative current when transistor TrA has been turned off. Diode 27 absorbs a counterelectromotive force. Zener diode 28 limits a voltage generated by the counterelectromotive force. The above-described configuration is the same as the configuration of the conventional circuit shown in FIG. 5 except that the delay-compensation-type pulse-width modulation circuit 21 is provided. Hence, the operation relating to this configuration is the same as that of the conventional circuit, and a detailed description thereof will be omitted.

Figure 11:
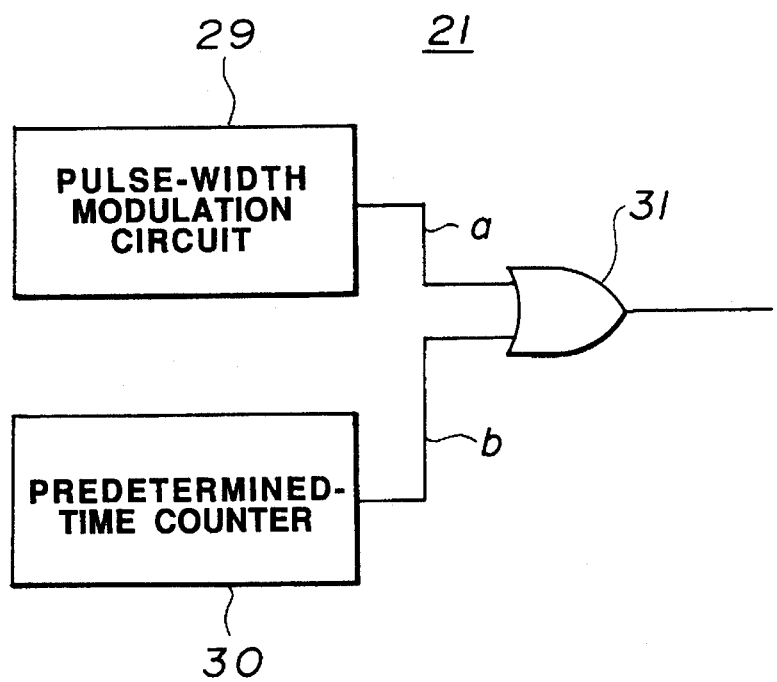
FIG. 11 is a detailed circuit diagram of the pulse-width modulation circuit shown in FIG. 10.
Figure 12:
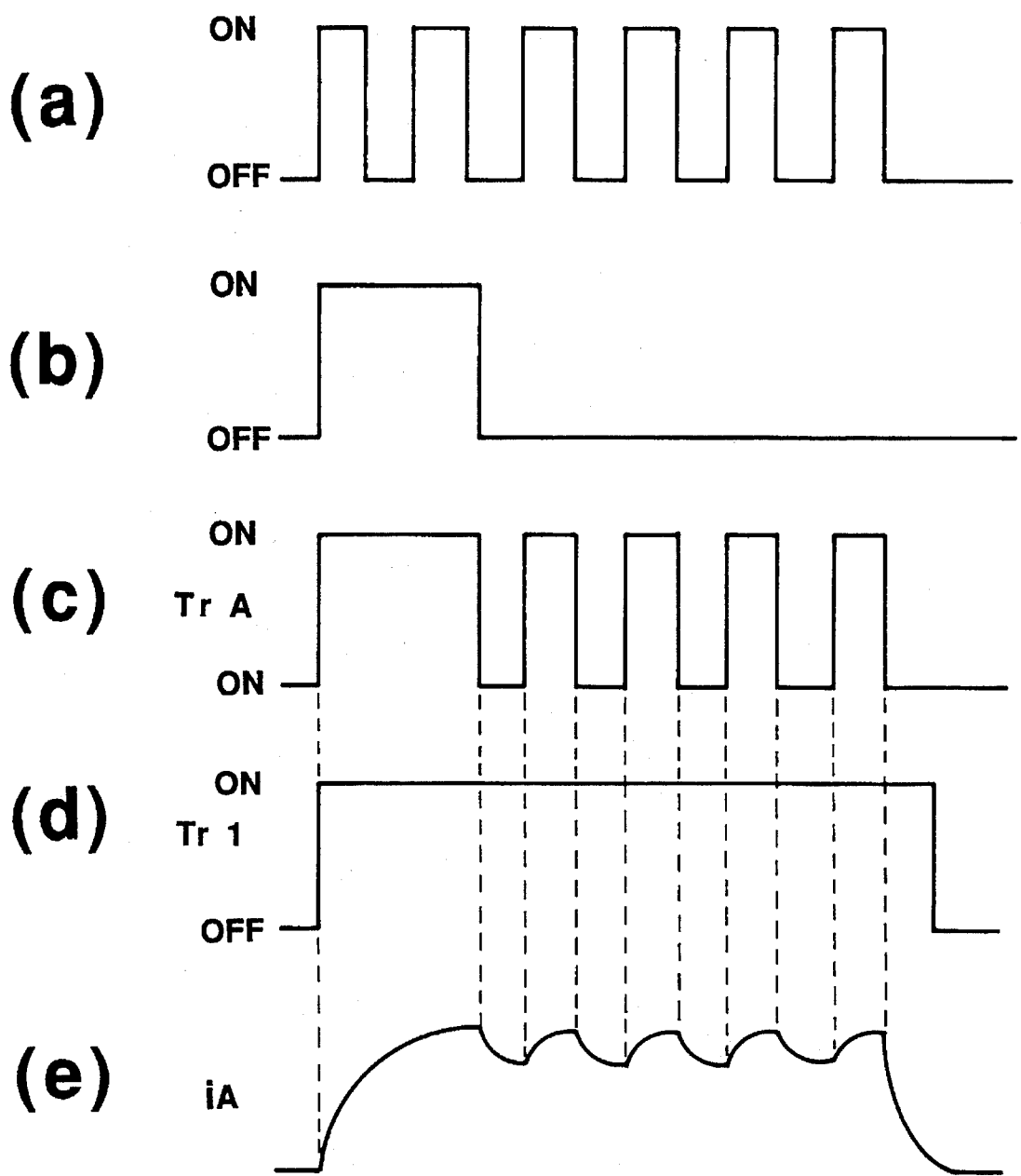
FIG. 12 illustrates time charts of respective units of the motor driver circuit shown in FIG. 10.

Next, a description will be provided of the configuration and the operation of delay-compensation-type pulse-width modulation circuit 21 with reference to FIGS. 11 and 12. Delay-compensation-type pulse-width modulation circuit 21 includes a pulse-width modulation circuit 29, a predetermined-time counter 30, and an OR circuit 31 to which the outputs a and b of these circuits are input.

FIG. 12(a) is a diagram illustrating the waveform of the output signal of pulse-width modulation circuit 29. When driving the stepping motor, this output signal is used for turning on and off transistor TrA with a predetermined ratio of "on" time to "off" time, in order to cause the flow of a desired current $I_A$ to the motor coil 22 (see FIG. 10) when a substantially steady state is provided after the lapse of a predetermined time period from exciting-phase switching. The time ratio $\chi_K$ of the pulse for obtaining the desired current $I_A$ is expressed by the following expression:

$$\chi_K = T_1/T_2 = E/I_A \times R - \tau_1/\tau_2 \tag{2}$$

where E (V) represents the power-supply voltage, R (Ω) represents the resistance of the coil, $\tau_1$ represents the rise time constant, $\tau_2$ represents the fall time constant, $T_1$ represents the "on" time of the pulse, and $T_2$ represents the "off" time of the pulse.

FIG. 12(b) is a diagram illustrating the waveform of the output signal of the predetermined-time counter 30. This output signal is used for obtaining the desired current $I_A$ as fast as possible within a predetermined time period from exciting-phase switching when driving the stepping motor, that is, for compensating for the time needed (that is, the occurrence of delay) in the conventional approach. The value of time $t_A$ to reach a desired current $I_A$ is deduced from the above-described expression (1), and is expressed by the following expression:

$$t_A = -\tau_1 \times \log\{1-(I_A \times R)(T_1+(\tau_1/\tau_2)T_2)/V \times T_2\} \tag{3}$$

Predetermined-time counter 30 counts the time corresponding to the above-described set time $t_A$, outputs an "on" output (a high-level output) during this period, and outputs an "off" output (a low-level output) after counting the set time.

FIG. 12(c) illustrates an output a, obtained by inputting the output of pulse-width modulation circuit 29 (shown in FIG. 12(a)) and an output, b, of predetermined-time counter 30 (shown in FIG. 12(b)) to the OR circuit 31 and obtaining an OR of the two outputs. As is apparent from FIG. 12(c), since the output of the delay-compensation-type pulse-width modulation circuit 21 is in an "on" state until coil current $i_A$ reaches the desired current $I_A$ thereof after exciting-phase switching, coil current $i_A$ promptly rises and reaches the desired current $I_A$. FIG. 12(e) illustrates the manner of the rise of the coil current $i_A$. FIG. 12(d) indicates that transistor Tr1 for exciting-phase switching is in an "on" state.

Figure 3:
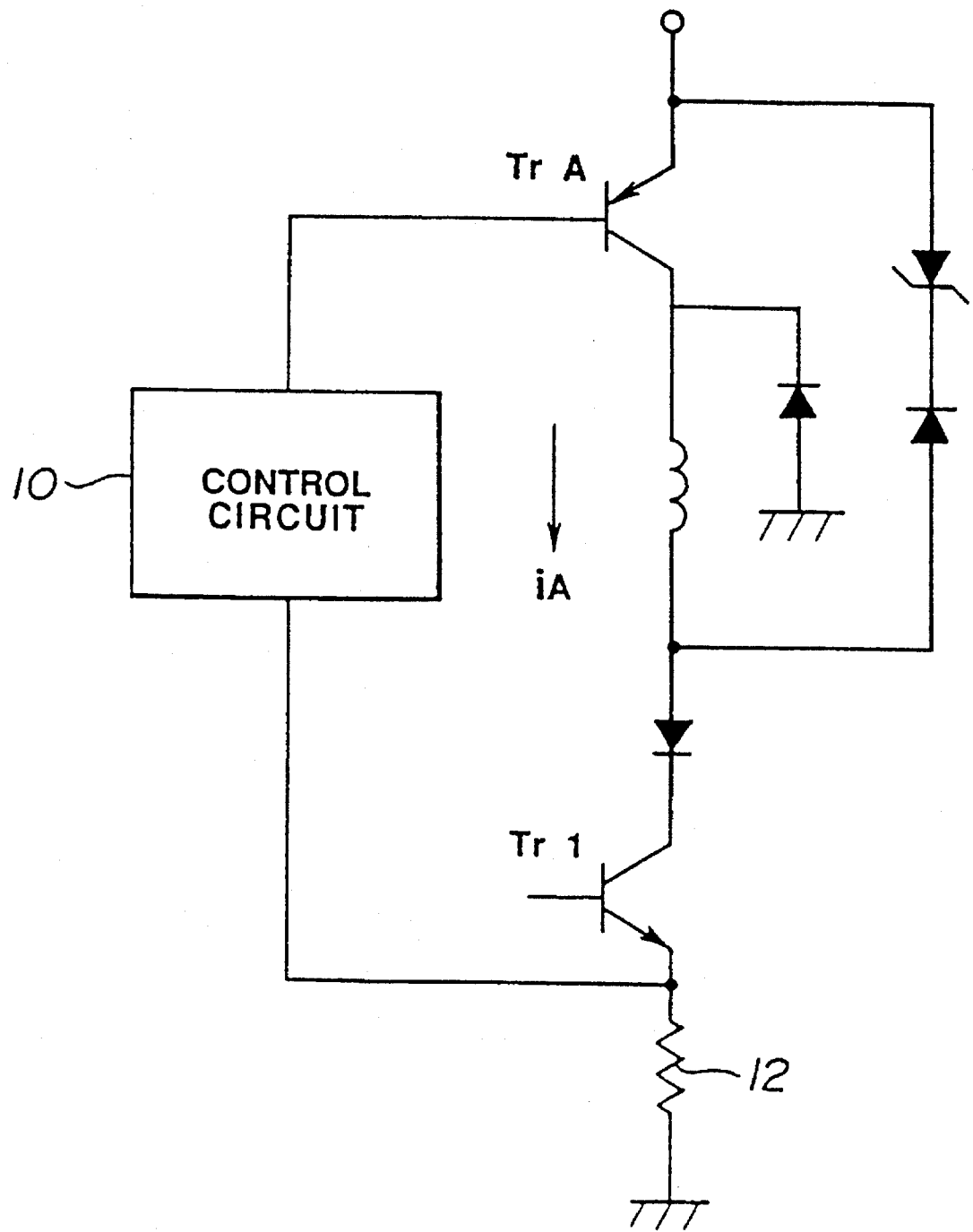
FIG. 3 is a circuit diagram illustrating a conventional example of the motor driver circuit shown in FIG. 1.
Figure 4:
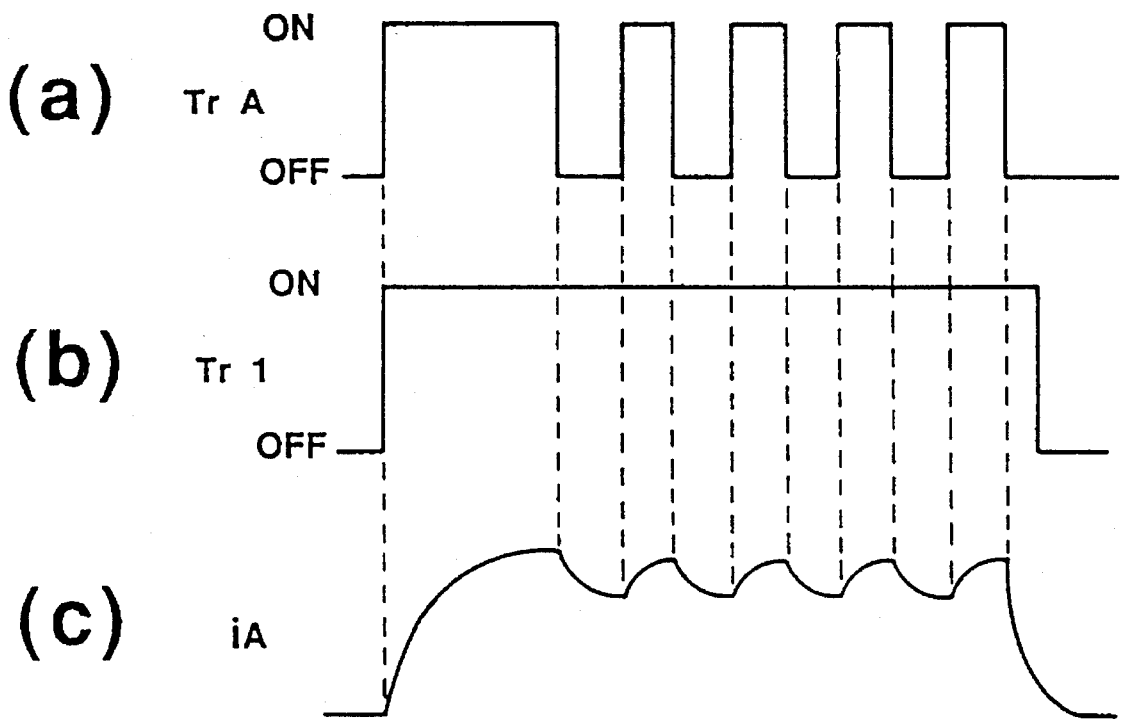
FIG. 4 illustrates time charts of respective units of the motor driver circuit shown in FIG. 3.

As described above, in the present embodiment, while the same coil-current rise characteristics as those of the constant-current PWM circuit shown in FIGS. 3 and 4 are obtained, a loss in electrical power due to the use of the current-detecting resistor shown in FIGS. 3 and 4 is not produced.

Figure 13:
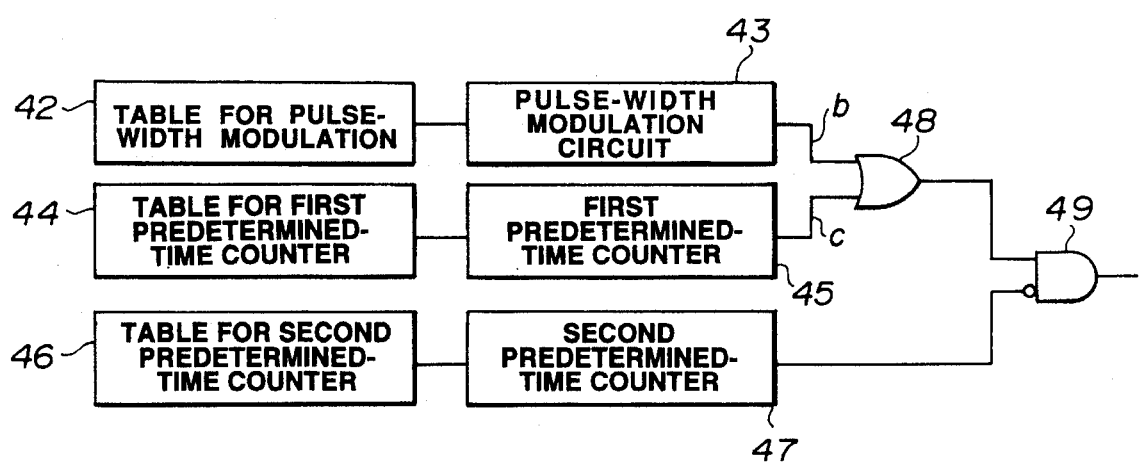
FIG. 13 is a circuit diagram illustrating another example of the motor driver circuit shown in FIG. 10.
Figure 14:
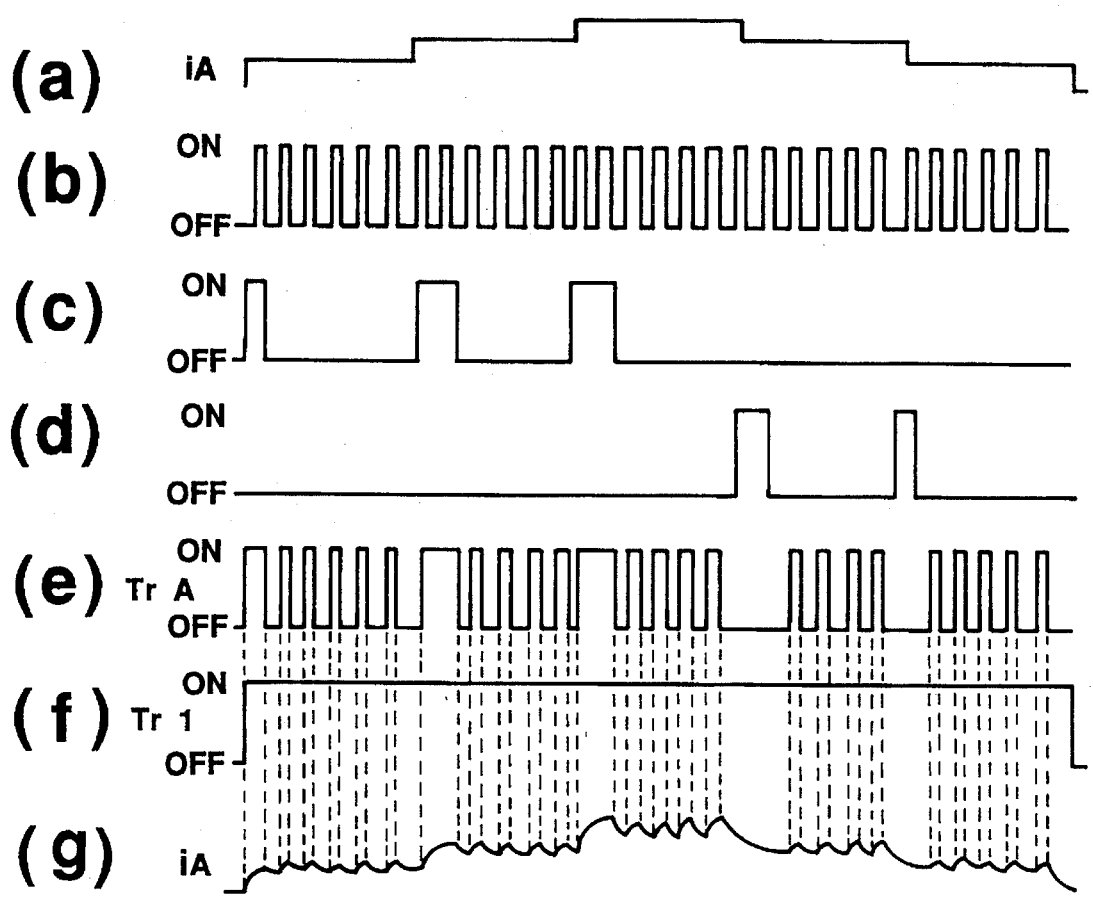
FIG. 14 illustrates time charts of respective units of the motor driver circuit shown in FIG. 13.

Next, a description will be provided of another example of the motor driver circuit which is applied to micro-step driving with reference to FIGS. 13 and 14. In this example, as shown in FIG. 14(a), a case in which the waveform of the coil current changes with time is dealt with. FIG. 13 illustrates the circuit 21 shown in FIG. 10. In FIG. 13, the table 42 for pulse-width modulation stores values of the "on" time $T_1$ and the "off" time $T_2$ for each desired current. A pulse-width modulation circuit 43 generates an actual pulsed waveform by referring to table 12 for pulse-width modulation. FIG. 14(b) illustrates an example of the output of the pulsed waveform generated by circuit 43. A table 44 for a first predetermined-time counter stores the time for the current to rise to the desired current when the current rises. Reference numeral 45 represents the first predetermined-time counter, which generates an actual pulsed waveform by referring to the above-described table 44 for the first predetermined-time counter. FIG. 14(c) illustrates an example of the output of the pulsed waveform generated by circuit 45. A table 46 for a second predetermined-time counter stores the time for the current to rise to the desired current when the current rises. Reference numeral 47 represents the second predetermined-time counter, which generates an actual pulsed waveform by referring to the above-described table 46 for the second predetermined-time counter. FIG. 14(d) illustrates an example of the output of the pulsed waveform generated by counter 47.

OR circuit 48 performs an OR operation on the output, b, of pulse-width modulation circuit 43 and the output c of the first predetermined-time counter, to perform compensation while current rises and to provide the output of pulse-width modulation after compensation. AND circuit 49 performs an AND operation on the output of the OR circuit 48 and the inverted output of the second predetermined-time counter, to provide the output after pulse-width modulation including compensation while the current rises, in addition to the output of the above-described OR circuit 48. FIG. 14(e) illustrates the output waveform at that time output from AND circuit 49. FIG. 14(f) illustrates the control signal for transistor Tr1. Tr1 is turned on when the CPU i determines that current is to flow in the motor coil. As shown in FIG. 14(g), compensation at rise and fall of the current caused by the time constant of the coil is performed on the current waveform of the coil, and prompt rise and fall of the current can be expected.

As described above in detail, according to the present invention, an acceleration table having a resolution of at least 8 bits can be formed with an inexpensive configuration using an 8-bit ROM for a stepping-motor control circuit. Hence, an acceleration table having only small variations in acceleration can be formed, and the torque margin is not reduced. As a result, loss of synchronism will not occur, and the time required to move a predetermined distance can be minimized. Furthermore, since the data length comprises 8 bits, the present invention can be easily applied, in particular, to a system configured by a one-chip microprocessor. Accordingly, if the stepping-motor driving control device of the present invention is applied, for example, to a copier, a laser-beam printer or the like, it is possible to provide a small inexpensive product having high performance.

According to the present invention, with a simple configuration, in which a circuit for continuing an "on" state of a current-supply pulse for a predetermined time period necessary for the rise of the current while the current rises immediately after exciting-phase switching is added to a pulse-width modulation circuit, it is possible to realize a low-power and high-efficiency stepping-motor driving control circuit of an open-loop-control type which does not require a current-detecting resistor. Similarly, with a simple configuration in which a circuit for continuing an "off" state of a current-supply pulse for a predetermined time period necessary for the fall of the current while the current falls immediately after exciting-phase switching is added to a pulse-width modulation circuit, it is possible to realize a low-power and high-efficiency stepping-motor driving control circuit of an open-loop-control type which does not require a current-detecting resistor.

The individual components represented by the blocks shown in FIGS. 1, 3, 5, 10, 11 and 13 are well-known in the stepping motor driving system art and their specific construction and operation is not critical to the invention or the best mode for carrying out the invention. Moreover, the steps recited in the specification for carrying out the present invention can be easily programmed into well-known central processing units by persons of ordinary skill in the art and since such programming per se is not part of the invention, no further description thereof is deemed necessary.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A stepping-motor driving system, comprising:

driving means, connected to a stepping motor, for driving the stepping motor by switching an exciting phase of coils thereof;

storage means for storing a table of an exciting-phase switching time of the stepping motor comprising absolute and differential exciting phase switching time data; and control means for controlling said driving means, said control means comprising a counter and comparing means for comparing a count of said counter with a value based on differential exciting phase switching time data stored in said storage means, wherein said control means increments said counter until a count of the counter equals the value based on the differential exciting phase switching time data stored in said storage means in accordance with a comparison of said comparing means, wherein said control means causes said driving means to switch an exciting phase of the stepping motor in response to the incrementing of said counter to equal the value based on the differential exciting phase switching time data stored in said storage means.

2. A stepping-motor driving system according to claim 1, wherein each time data of the table stored in said storage means includes a sign bit.

3. A stepping-motor driving system according to claim 1, wherein each time data of the table stored in said storage means includes a shift-request bit.

4. A stepping-motor driving system, comprising:

driving means, connected to a stepping motor, for driving the stepping motor by switching an exciting phase of exciting coils thereof, said driving means comprising a delay-compensation-type pulse-width modulation circuit for compensating for a delay caused by a time constant of an exciting coil of the stepping motor, wherein said delay-compensation-type pulse-width modulation circuit compensates for the delay in a rise of the current of the exciting coil by changing the current flowing through the exciting coil;

storage means for storing a table of an exciting-phase switching time of the stepping motor comprising absolute and differential exciting phase switching time data; and control means for controlling said driving means, said control means comprising a counter and comparing means for comparing a count of said counter with a value based on differential exciting phase switching time data stored in said storage means, wherein said control means increments said counter until a count of the counter equals the value based on the differential exciting phase switching time data stored in said storage means, wherein said control means causes said driving means to switch an exciting phase of the stepping motor in response to the incrementing of said counter to equal the value based on the differential exciting phase switching time data stored in said storage means.

5. A stepping-motor driving system according to claim 4, wherein said driving means comprises a driving transistor for causing a flow of current in the exciting coil, and wherein said delay-compensation-type pulse-width modulation circuit comprises a circuit for causing the flow of a desired average current in the coil, a counter for counting the time said driving transistor remains turned on during the rise of current of the coil, and an OR circuit receiving the output of said circuit for causing the flow of a desired average current in the coil and the output of said counter for counting the time said driving transistor remains turned on.

6. A stepping-motor driving system, comprising:

driving means, connected to a stepping motor, for driving the stepping motor by switching an exciting phase of exciting coils thereof, said driving means comprising a delay-compensation-type pulse-width modulation circuit for compensating for a delay caused by a time constant of an exciting coil of the stepping motor, wherein said delay-compensation-type pulse-width modulation circuit compensates for the delay in a fall of the current of the exciting coil by changing the current flowing through the exciting coil;

storage means for storing a table of an exciting-phase switching time of the stepping motor comprising absolute and differential exciting phase switching time data; and control means for controlling said driving means, said control means comprising a counter and comparing means for comparing a count of said counter with a value based on differential exciting phase switching time data stored in said storage means, wherein said control means increments said counter until a count of the counter equals the value based on the differential exciting phase switching time data stored in said storage means, wherein said control means causes said driving means to switch an exciting phase of the stepping motor in response to the incrementing of said counter to equal the value based on the differential exciting phase switching time data stored in said storage means.

* * * * *

UNITED STATES PATENT AND TRADEMARK OFFICE
CERTIFICATE OF CORRECTION

PATENT NO. : 5,485,070
DATED : January 16, 1996
INVENTOR(S) : HIDEKAZU TOMINAGA

It is certified that error appears in the above-indentified patent and that said Letters Patent is hereby corrected as shown below:

<u>COLUMN 4</u>

Figure 5:
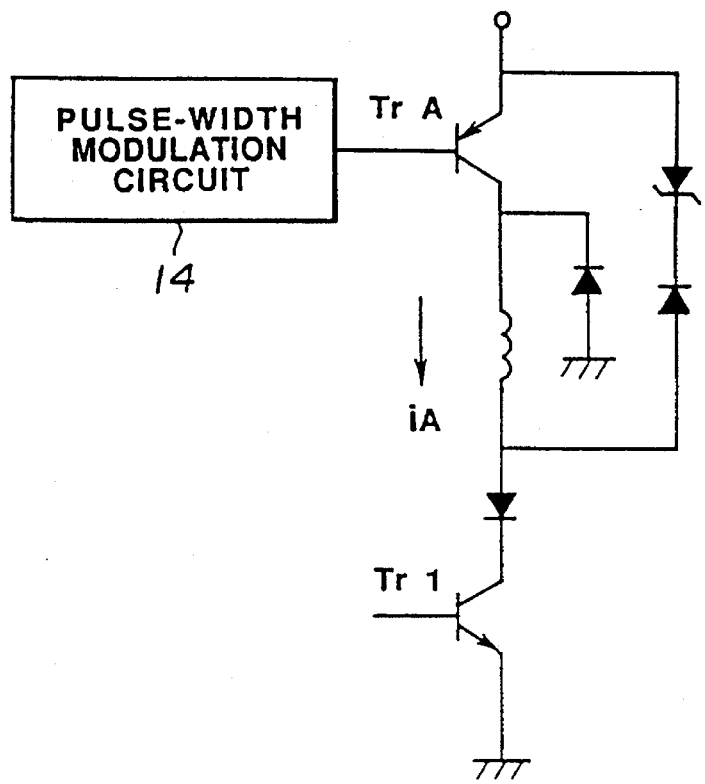
FIG. 5 is a circuit diagram illustrating another conventional example of the motor driver circuit shown in FIG. 1.
Figure 6:
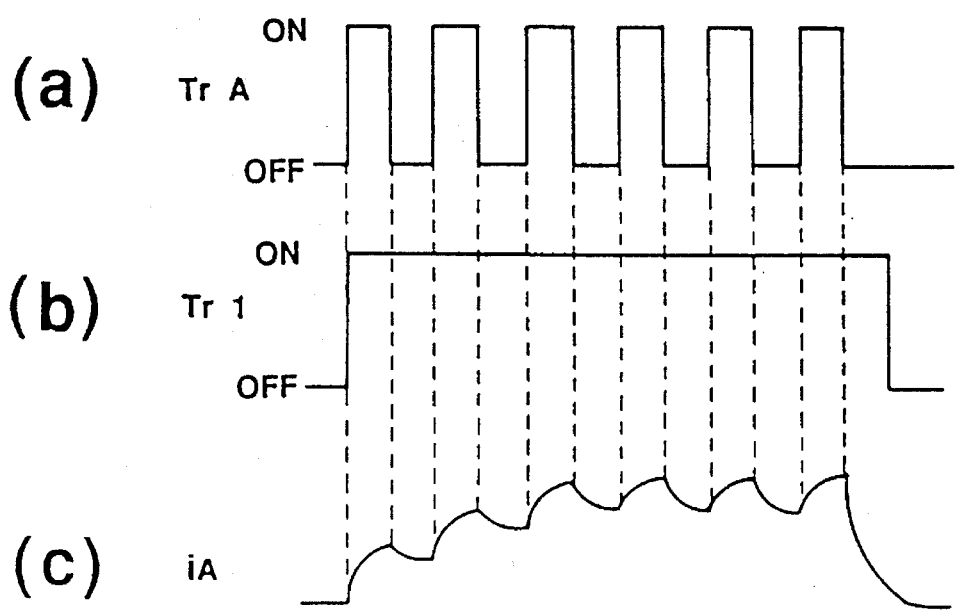
FIG. 6 illustrates time charts of respective units of the motor driver circuit shown in FIG.

Line 46, "FIG." should read --FIG. 5;--.

<u>COLUMN 6</u>

Line 10, "[1 bits." should read --8 bits.--.

Signed and Sealed this

Eleventh Day of June, 1996

Attest:

BRUCE LEHMAN

*Attesting Officer*      *Commissioner of Patents and Trademarks*